United States Patent [19]

Tsubone et al.

[11] Patent Number: 5,004,401
[45] Date of Patent: Apr. 2, 1991

[54] LAYER PALLETIZING METHOD

[75] Inventors: Akira Tsubone; Masanori Tomiyoshi; Junichi Yokomizo, all of Fukuoka; Nobuhiro Tanaka, Saitama; Hideyuki Moriguchi, Saitama; Eiji Hirata, Saitama, all of Japan

[73] Assignees: Kao Corporation, Tokyo; Seibu Electric and Machinery Co., Ltd., Kasuya, both of Japan

[21] Appl. No.: 316,521

[22] Filed: Feb. 27, 1989

Related U.S. Application Data

[63] Continuation of Ser. No. 919,011, Oct. 15, 1986, abandoned.

[30] Foreign Application Priority Data

Oct. 15, 1985 [JP] Japan ................................ 60-230273
Mar. 13, 1986 [JP] Japan ................................ 61-56569
Mar. 24, 1986 [JP] Japan ................................ 61-65520
Mar. 26, 1986 [JP] Japan ................................ 61-65823

[51] Int. Cl.$^5$ ............................................ B65G 57/26
[52] U.S. Cl. ................................ 414/786; 414/791.8; 414/792; 414/902; 414/907
[58] Field of Search ................ 414/791.6, 791.8, 792, 414/786, 902, 907

[56] References Cited

U.S. PATENT DOCUMENTS

| | | | |
|---|---|---|---|
| 4,641,271 | 2/1987 | Konishi et al. | 414/902 X |
| 4,692,876 | 9/1987 | Tenma et al. | 414/110 X |
| 4,836,731 | 6/1989 | Abrahamson | 414/789.1 |

FOREIGN PATENT DOCUMENTS

| | | | |
|---|---|---|---|
| 2582629 | 12/1986 | France | 414/902 |
| 239999 | 10/1986 | German Democratic Rep. | 414/902 |
| 49-41038 | 11/1974 | Japan . | |
| 50-29230 | 9/1975 | Japan . | |
| 55-111322 | 8/1980 | Japan . | |
| 57-77123 | 5/1982 | Japan . | |
| 100024 | 6/1983 | Japan | 414/792 |
| 60-19118 | 6/1985 | Japan . | |
| 60-101607 | 6/1985 | Japan . | |
| 61-33426 | 2/1986 | Japan . | |

Primary Examiner—Robert J. Spar
Assistant Examiner—Janice Krizek
Attorney, Agent, or Firm—Cushman, Darby & Cushman

[57] ABSTRACT

This invention relates to a method of palletizing a variety of goods by layers and a device therefor. Goods are formed in a unit load by palletizing them layer by layer in the order of layer area dimensions from the bottom with due consideration to layer area dimensions of goods, dimensions of void spaces which are not occupied with goods, and the dimensional relation among goods so that the palletized goods will not collapse during transportation. A good may fall into the void on the layer below or project beyond the edge of a lower layer to disturb the equilibrium. The palletizing method according to this invention facilitates handling of easily collapsible cases such as corrugated fiberboard boxes in a unit load by pressing at least the two sides of one layer of goods, releasing the pressure and then pressing and holding the same again. This invention method is characterized by palletizing layers of goods in a unit load which has at least one side surface substantially vertical to the bottom surface so that the unit load can be consolidated in the horizontal direction simply but securely by an automatic strapping machine for preventing collapse in transportation. In order to achieve such objects, this invention includes a palletizing device having a mechanism of holding one layer of goods having a good pressing device, a controller for pressing with said goods pressing device, a controller for controlling the order of palletizing, a centering mechanism which registers said holding mechanism with the center of a good layer, a detector which determines the position for suspending a truck so as to align the sides of layers uniformly, and a lifter for unit load which moves a unit load up and down in respect of said holding mechanism.

2 Claims, 19 Drawing Sheets

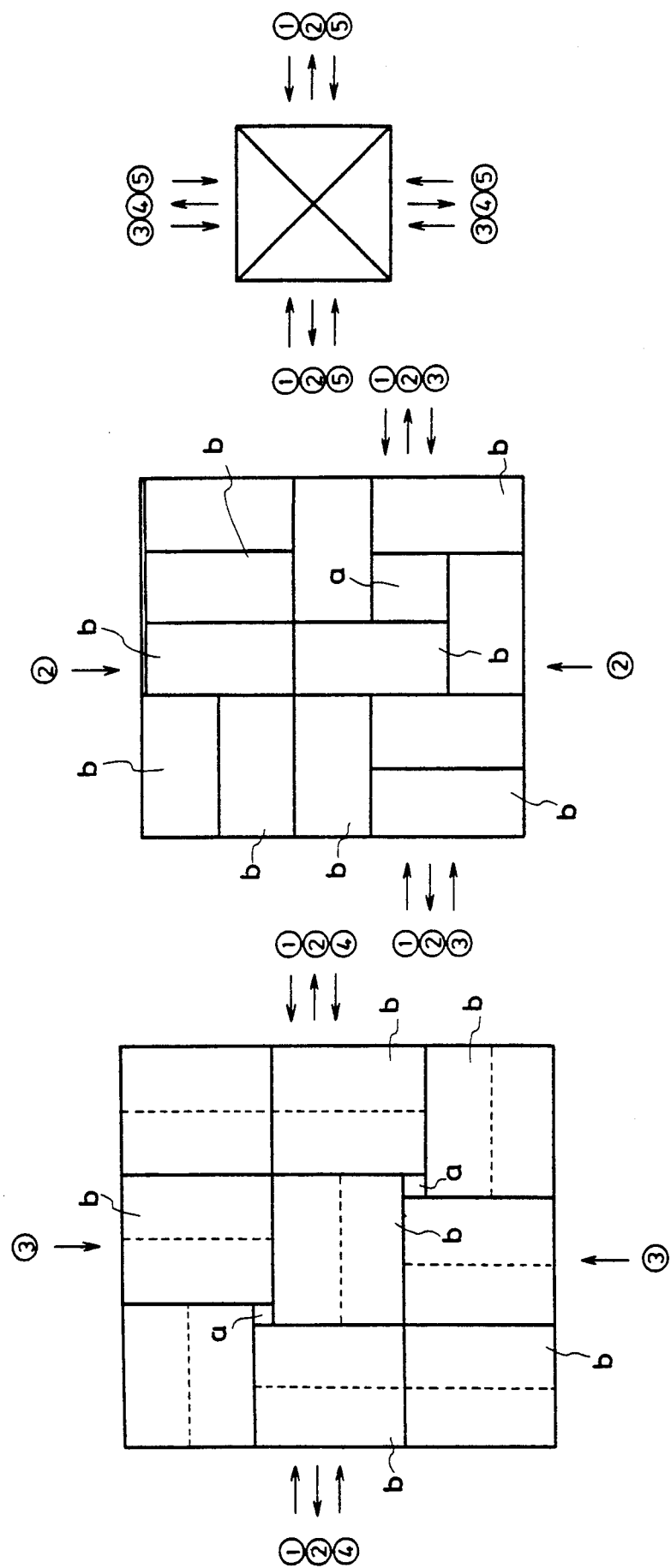

LAYER PALLETIZING METHOD

This is a continuation of application Ser. No. 06/919,011 filed Oct. 15, 1986, which was abandoned upon the filing hereof.

BACKGROUND OF THE INVENTION

This invention concerns a method of palletizing goods such as corrugated fiberboard boxes by one layer and a device therefor, and more particularly the invention concerns a method of palletizing a variety of goods in multiple layers to form a unit load, and a device therefor.

As device handling goods in the unit of layers, there have been known in the prior art those disclosed in Japanese Patent Application Laid Open Nos. Sho 55-111322 and Sho 57-7123, and Utility Model Publication No. Sho 60-19118.

The device disclosed in Japanese Patent Application Laid Open No. Sho 55-111322 comprises a chuck head having a centering mechanism, and a load holding device which is mounted in a position opposite to said chuck head and is advanced/receded from the chuck head by cylinders controlled via a positioner.

Japanese Patent Application Laid-Open No. Sho 577123 discloses a device for holding one layer which comprises two pairs of goods pressing devices which are opposed to each other and which can pressingly hold four sides of a layer of goods such as corrugated fiberboard boxes substantially at the same time.

Japanese Utility Model Publication No. Sho 60-19118 discloses a four side clamp lift having four clamp plates which can be rotated so that in a manner allowing at least one of the clamp plates to be moved to a position not to oppose the clamping plates on the other side.

All of the techniques described in the prior art, however, have inherent problems.

In the device of Japanese Patent Application Laid-Open No. Sho 55-111322, as goods are held by linear contact with rollers, this method is hardly effective in holding collapsible cases such as corrugated fiberboard boxes although it is effective in holding rigid articles such as concrete blocks.

The method disclosed in Japanese Utility Model Publication No. Sho 60-19118 can handle a unit load each of which layers comprises corrugated fiberboard boxes and is of the form of a rectangular parallelepiped. However when handling such unit loads after they are transported by vehicles such as a truck, the layers are often disturbed during transportation and clamping plates alone cannot apply sufficient pressure to consolidate the load, and if the pressure should increase, it will damage boxes.

Neither Japanese Patent Application Laid-Open No. Sho 55-111322 nor Japanese Utility Model Publication No. Sho 60-19118 describes nor suggests any means for palletizing a variety of goods in multiple layers.

Japanese Patent Application Laid-Open No. Sho 57-77123 discloses an application of a method for stacking arbitrary goods to form one layer and placing layers on an empty pallet, but it does not disclose a means for controlling the palletizing order. If a layer with a larger area is placed on another layer with a smaller area, the unit load will often collapse during the transportation by a truck.

The above invention also discloses the method applied to a system which palletizes arbitrary goods layer by layer and then on an empty pallet in multi-layers. But as the two pairs of opposing pressing plates are moved to the center in synchronization by respective racks and pinion mechanisms, the centers of palletized layers coincide even if goods of different sizes are assembled in one layer to thereby make all the four sides of the unit load irregular with recesses or projections. Such a unit load should be horizontally strapped across the top most layer to prevent collapses during truck transportation. Utility Model Publication No. Sho 49-41038 discloses one of such strapping devices.

The device which is disclosed in Japanese Uility Model Publication No. Sho 49-41038 is adapted to move an automatic strapping machine forward/backward and the machine needs to be placed at a position substantially close to the goods. This device, if used for the unit loads having unstraight side lines, will not be able to strap them completely. Particularly, if the unit load is shaped like a pyramid, the automatic strapping machine often stays close to the second layer from the top rather than to the topmost layer and thereby fails to consolidate the goods completely.

In the prior art there have been known mechanisms for holding one layer of goods such as the one disclosed Japanese patent Application Laid-Open No. Sho 57-77123; and a positioning mechanism such as the one disclosed in Japanese Patent Publication Sho 50-29230.

In the device disclosed in Japanese Patent Application Laid-Open No. Sho 57-77123, semi-spherical receptors are fixed at four corners of the upper surface of a transportation truck, and rotatable balls are placed upon the receptors in such a manner that a portion thereof projects beyond the rim of the upper surface. The mechanism for holding a layer of goods which is to be carried on the above truck includes a positioning device comprising concave members at the four corners on the bottom surface of a main body of the mechanism with respective centers coinciding with the apexes of said rotatable balls.

Japanese Patent Publication No. Sho 50-29230 discloses positioning mechanism which moves a floating pallet supported on a fixed frame in a horizontally movable manner together with goods which are placed on the pallet in a substantially random fashion.

The conventional positional mechanisms such as those mentioned above had the following problems. The positioning mechanism described in Japanese Patent Application Laid-Open No. Sho 57-77123 has the structure to position one layer of goods by using rotatable balls and concave members, so that it is not effective when the position of goods deviates widely from the position of the mechanism body. If the scope covered by the centering mechanism is extensive, the concave members had to be made larger in size, which leads to a members greater difference between the center and the periphery of a concave member. If goods with large deviation are attempted to be held with such a mechanism, the holding mechanism will lose horizontal balance and fail to hold goods. Thus merely increasing the size of a concave member did not achieve accurate positioning.

Although the positioning mechanism disclosed in Japanese Patent Publication No. Sho 50-29230 can center goods placed on a floating pallet, it cannot center goods piled in plural layers in the unit of layers. More particularly, if the goods at the topmost layer are held and centered by the mechanism, the goods on the second from the topmost layer or below and the floating pallet will not move and only those at the topmost layer slide and move along upon the layer second from the top. The mechanism is not effective in centering the goods on the second layer and therebelow as they tend to collapse.

Accordingly, an object of this invention is to provide a method for palletizing by layers which can solve these problems encountered in the prior art which can securely hold a unit load which comprises layers of a variety of goods such as corrugated fiberboard boxes, and which can form goods in a predetermined shape in a simple manner and a device therefor.

Another object of this invention is to provide a method for palletizing goods in the unit of layers which can consolidate a unit load of a variety of goods in plural layers in a form suitable to be horizontally strapped by an automatic strapping machine securely and yet easily so as not to cause collapse of loads during transportation and a device therefor.

In order to achieve above the objects, this invention method forms a unit load by assembling a variety of goods for one layer with due consideration to layer area dimensions of such goods, dimensions of void spaces which are not occupied with the goods on the layer, and the dimensional relation among goods, and by stacking such layers from the bottom in the order of the area size of a layer in a manner not to let a package on the upper layer fall into a void on the layer below or not to cause goods project beyond the edge of the layer below to disturb the equilibrium.

The formed unit load is basically in the shape of a pyramid and very stable as there is no possibility for any package to fall downward or project sideward which might otherwise cause collapse of loads.

This invention method is characterized in that it assembles and palletizes a variety of goods layer by layer in plural layers in a manner to make at least one side of the unit of layers of goods form a plane substantially vertical to the bottom thereof.

With such a plane on at least one side of the layer of goods substantially vertical to the bottom surface, the unit load formed according to this invention can be effectively strapped with an automatic strapping machine as the strapper consolidates the boxes by using the plane as a reference and as the side of the assembled boxes forms a straight line without irregularities to allow close contact between the strapping machine and boxes.

This invention method is effective in palletizing such slightly loose unit loads as those after transportation by a truck without damaging the goods because the method with two pairs of goods pressing devices presses at least the two sides of a layer of goods of the unit load, then releases the pressure and pressingly holds them again.

The device for palletizing by layer according to this invention includes a mechanism for holding one layer of goods comprising two pairs of goods pressing devices having goods pressing boards and driving mechanisms for the pressing boards which are mounted at four sides to oppose each other, a controller which controls the pressing operation of said goods pressing device, and a controller for the palletizing order.

This apparatus of this invention for holding one layer of goods preferably includes a centering device which comprises ball receptors fixed on a frame (including a truck) on which the mechanism of holding one layer of goods is carried, rotatable balls mounted on the receptors in a manner to partially project therefrom, and flat receiving surfaces on said mechanism to oppose said rotatable balls and which can center said mechanism with the center of goods.

This invention device preferably includes a detector which can detect the position where the truck stops by using a board provided at the advancing end of the truck.

This invention device preferably includes a unit load lifting device which can move unit loads vertically in relation to the mechanism of holding one layer of goods.

This invention device for the palletizing order preferably includes a means to store dimensions of the layer areas of goods, of void spaces unoccupied with goods and of each good so as to select an optional order out of predetermined palletizing orders based on the dimensional relation among the above.

This invention device for the pressing operation preferably includes a means to select a suitable pressure out of plural pressures available.

The effect of this invention device will be achieved as below.

An optimal pressure can be selected from plural pressures operable in the pressing device with said controller so that the layer of goods may be pressed by necessary and sufficient but not excessive pressure determined depending on the particular unit load to achieve effective palletization in the unit of a layer without causing damage to the goods.

The above holding mechanism is made freely movable by said centering device as the main body of the mechanism can slide with the planar receiving surfaces upon the rotatable balls on the frame to be smoothly positioned at the center of goods. Goods in multiple layers may effectively be centered in the unit of layers.

A unit load with at least one side surface thereof substantially vertical to the bottom surface can be easily formed by detecting the pressing board abutted against the advancing end of goods while traveling with said detector to as to align sides of goods in a layer.

Unit loads of a desirable shape and dimension can be formed out of goods piled in an arbitrary height by said unit load lifting device.

Goods are automatically palletized in accordance with the predescribed order of said controller for the palletizing order.

This invention can therefore achieve such effect as palletizing a variety of goods such as corrugated fiberboard boxes in multiple layers to form a unit load securely in a predetermined form in a simple manner. This invention further attains such effect as to allow horizontal consolidation by an automatic strapping machine.

BRIEF DESCRIPTION OF THE DRAWINGS

FIGS. 5A through 5C are explanatory views to show the fifth embodiment of this invention palletizing method.

DETAILED DESCRIPTION

Preferred embodiments of this invention will now be described in detail by referring to the attached drawings.

Figure 1:
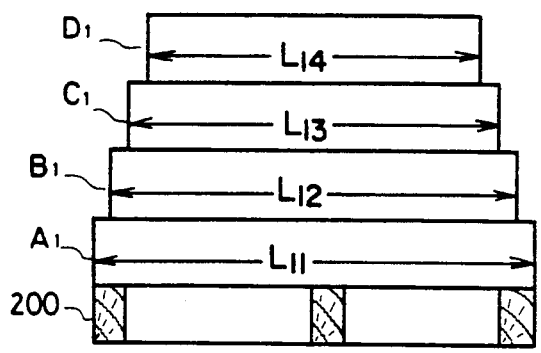
FIG. 1 is an explanatory view to show the first embodiment of this invention palletizing method.

FIGS. 1 through 5 explain the palletizing method of this invention. FIG. 1 is a view to explain a unit load palletized by the first embodiment method according to this invention. Upon a pallet 200, layers of goods of different kinds $A_1$, $B_1$, $C_1$ and $D_1$ having layer area dimensions $L_{11}$, $L_{12}$, $L_{13}$, and $L_{14}$ ($L_{11} > L_{12} > L_{13} > L_{14}$) are piled in the order of the dimension from the bottom upward.

Figure 2A:
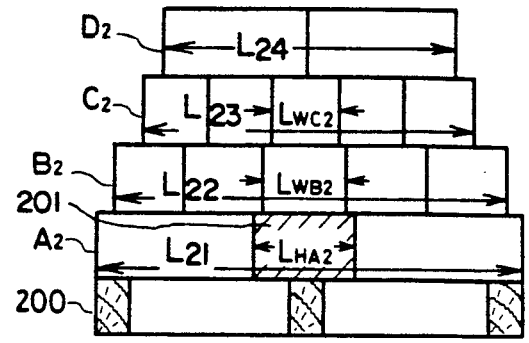
FIGS. 2A through 2C are explanatory views to show the second embodiment of this invention palletizing method.
Figure 2B:
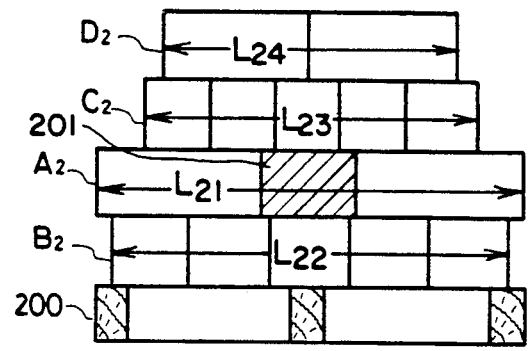
Figure 2C:
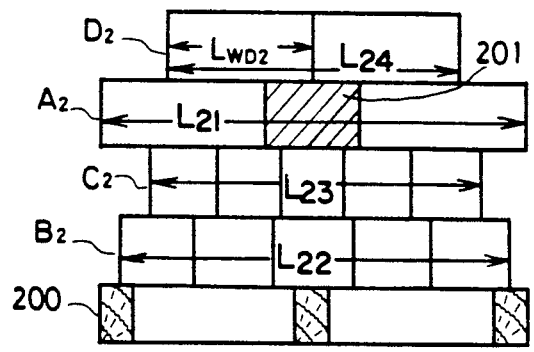

FIGS. 2A through 2C are explanatory views to show the order of formation of a unit load palletized by the second embodiment method of this invention. This is the case where layers of goods of different kinds $A_2$, $B_2$, $C_2$ and $D_2$ having layer area dimensions $L_{21}$, $L_{22}$, $L_{23}$ and $L_{24}$ ($L_{21} > L_{22} > L_{23} > L_{24}$) are assembled, the layer of goods $A_2$ has a void space having the area $L_{HA2}$, and the dimension of the void space $L_{HA2}$ is larger than those of the goods $L_{WB2}$ of the goods $B_2$ and those of the goods $L_{WC2}$ of the goods $C_2$.

If goods are piled from the bottom layer in the dimensional order, as shown in FIG. 2A, one of the goods of the layer $B_2$ immediately above the void space 201 will fall into the void space 201. If the layer of goods $A_2$ is replaced with the layer of goods $B_2$ as shown in FIG. 2B, then one of the goods in layer of goods $C_2$ immediately above the void space 201 will fall therein.

If the layer of goods $A_2$, is replaced with the layer of goods $C_2$ as shown in FIG. 2C, as the dimension of a good $L_{WD2}$ in the layer of goods $D_2$ is sufficiently larger than the dimension of the void space $L_{HA2}$, the good won't fall into the void space 201 and the assembled layers stay stable.

Figure 3A:
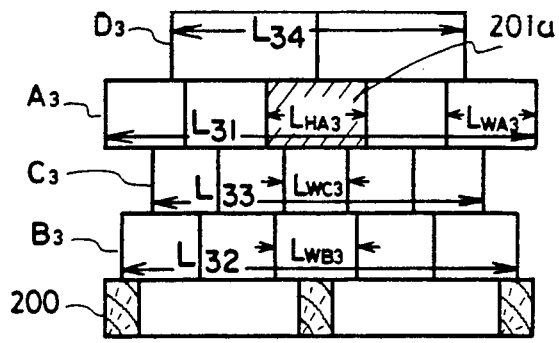
FIGS. 3A through 3C are explanatory views to show the third embodiment of this invention palletizing method.
Figure 3B:
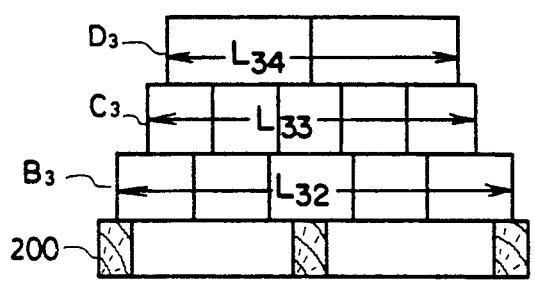
Figure 3C:
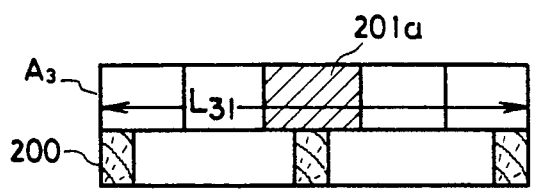

FIGS. 3A through 3C are explanatory views to show the order of formation of a unit load palletized by the third embodiment of this invention method. In this case, layers of goods of different kinds $A_3$, $B_3$, $C_3$ and $D_3$ having layer area dimension $L_{31}$, $L_{32}$, $L_{33}$ and $L_{34}$ ($L_{31} > L_{32} > L_{33} > L_{34}$) are assembled in layers, the layer of goods $A_3$ has a void space 201a of area dimension $L_{HA3}$, and the dimension of the void space $L_{HA3}$ is larger than those of the goods $LWB3$ of the goods $B_3$ and those of the goods $L_{WC3}$ of the goods $C_3$. The layers are changed in order by the second embodiment method to have the state shown in FIG. 3A wherein the layer of goods $A_3$ with the void space 201a projects from the layer of goods $C_3$ to disturb the balance. This inconvenience will be obviated by removing the layer of goods $A_3$, re-forming the unit load in the order of the layers $B_3$, $C_3$ and $D_3$ from the bottom or the order of layer dimension to form a unit load as shown in FIG. 3B and forming another separate unit load with the layer of goods $A_3$ alone as shown in FIG. 3C.

In the description above, layer area dimension, void space dimension and good dimension may suitably be defined by lateral or vertical length, or the sum thereof depending on the shapes of goods to be palletized.

The above description of the embodiments is in respect of the basic method according to this invention which enables plural kinds of goods of different layer area dimensions, void space dimensions and good dimensions to be piled in a unit load of basically a pyramid formation in a manner to prevent collapse which might otherwise be caused by falling or projecting goods.

Figure 4:
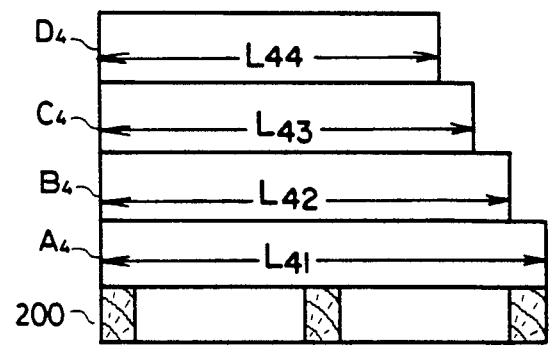
FIG. 4 is an explanatory view to show the fourth embodiment of this invention palletizing method.

FIG. 4 shows a unit load palletized by the fourth embodiment of this invention method. Upon a pallet 200, layers of good $A_4$, $B_4$, $C_4$ and $D_4$ of different kinds and of layer area dimensions $L_{41}$, $L_{42}$, $L_{43}$ and $L_{44}$ ($L_{41} > L_{42} > L_{43} > L_{44}$) are piled with their left side aligned linearly and in the order of decreasing area dimension from the bottom.

The second and third embodiment methods are recommendable for layers which have void spaces or any layer which includes goods which might disturb the equilibrium.

As the left sides of all the layers are registered linearly in the fourth embodiment method, the formed unit load has a planar side surface which is vertical to the bottom surface. The side is, however, not necessarily vertical to the bottom surface and may be substantially vertical thereto so long as the layers can be strapped with an automatic strapping machine securely. The number of side surfaces which is preferably vertical to the bottom is at least one.

As described above, the unit load palletized by this embodiment method has one side face vertical to the bottom surface and by the first through the third. By the method, layers of different goods of different layer area dimensions and different good dimensions with or without void space therein can be piled up in a basically pyramid form except for the aligned one side face so as to allow secure consolidation with an automatic strapping machine in the horizontal direction and to prevent collapse.

FIGS. 5A through 5C are explanatory views to show the fifth embodiment of this invention palletizing method and to show, in particular, the structure of a layer of goods such as corrugated fiberboard boxes and the order of pressing with denotes a void space, b a box, and numerals in circles the order of pressing. As shown in FIG. 5A with (1) goods pressed in the lateral direction to correct misalignment among goods in that direction, the pressure is then released temporarily as shown with (2) then goods are pressed in the vertical direction to correct misalignment in that direction as shown in (3) and goods are pressed in the lateral direction again while maintaining the pressure in the vertical direction. Consolidated goods are held in the unit of a layer and palletized at a predetermined position.

The order of pressing, however, is not limited to the above, but may be the one shown in FIG. 5B wherein cases are pressed in the vertical direction as soon as the pressure in the lateral direction is released, or the one shown in FIG. 5C wherein misalignments in both directions are corrected respectively, and the pressure is released in both directions, and then cases are pressed in both directions simultaneously.

According to this embodiment method, goods in one layer are pressed at least on two sides, the pressure is released temporarily, and goods are pressed again. In this way, even if a unit load is slightly loosened during transportation, it can be palletized without inflicting damage on the goods.

Figure 6:
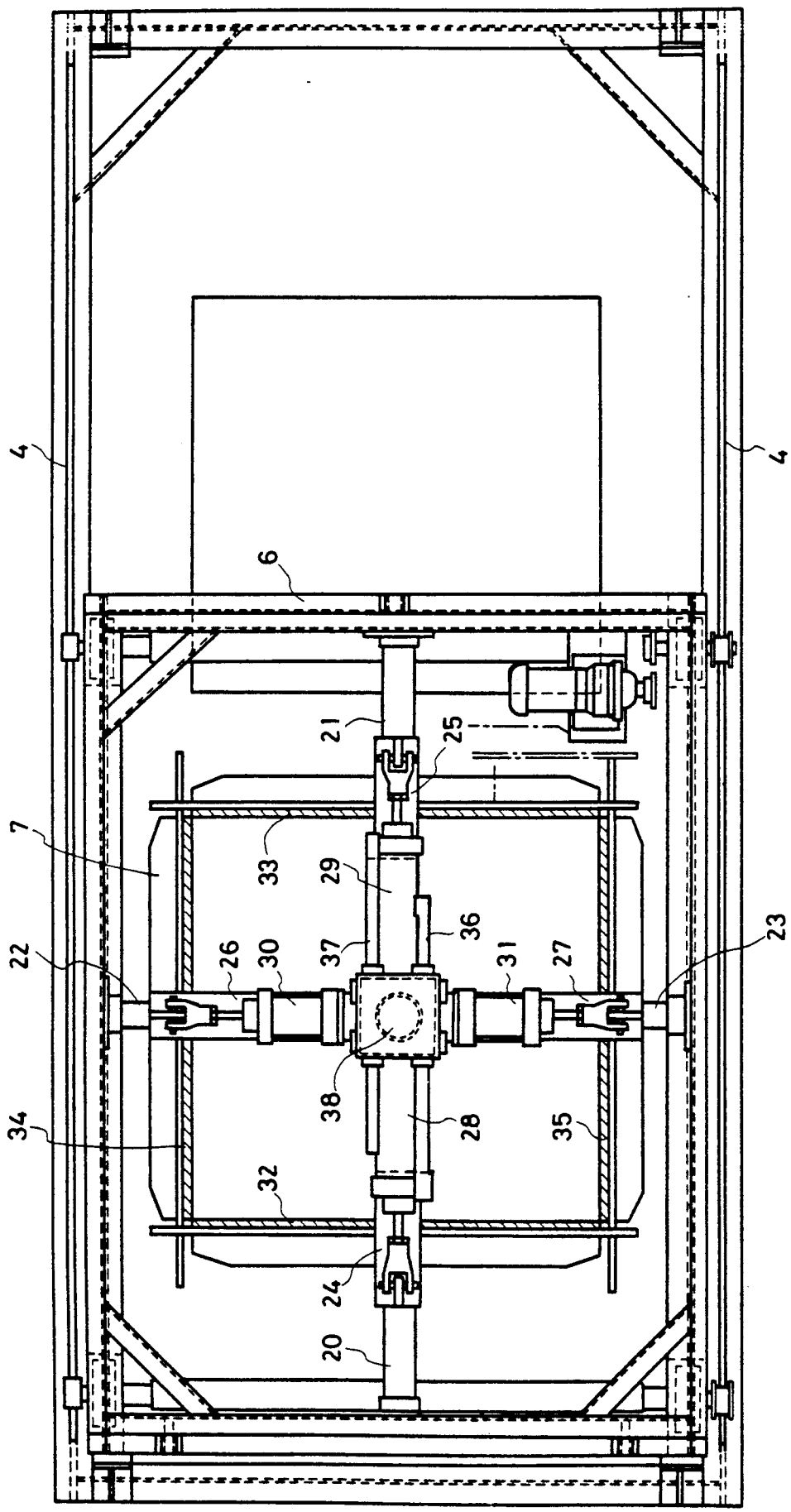
FIG. 6 is a plane view of the first embodiment of this invention palletizing device.
Figure 7:
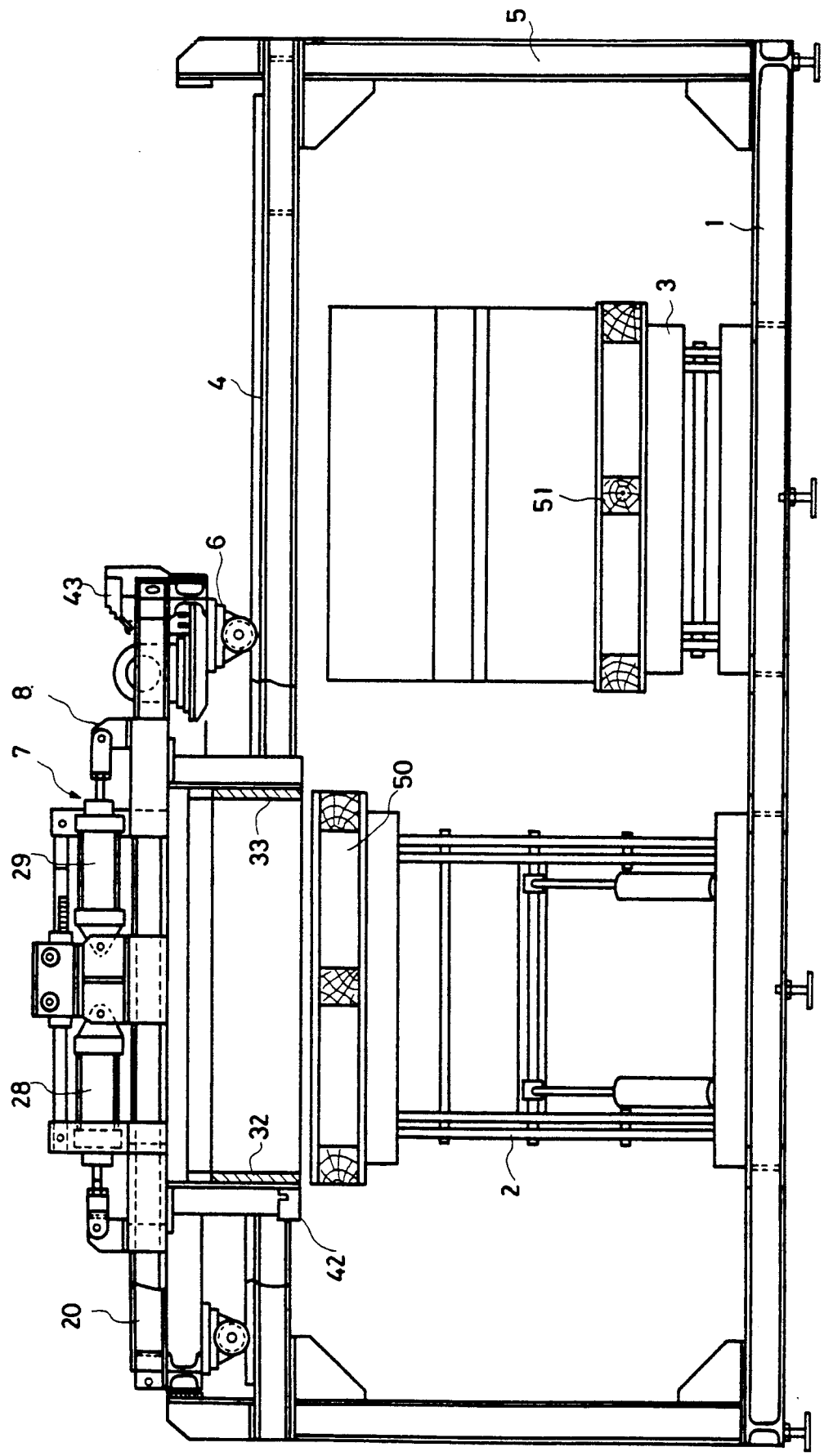
FIG. 7 is a frontal view of the first embodiment of this invention device.
Figure 8:
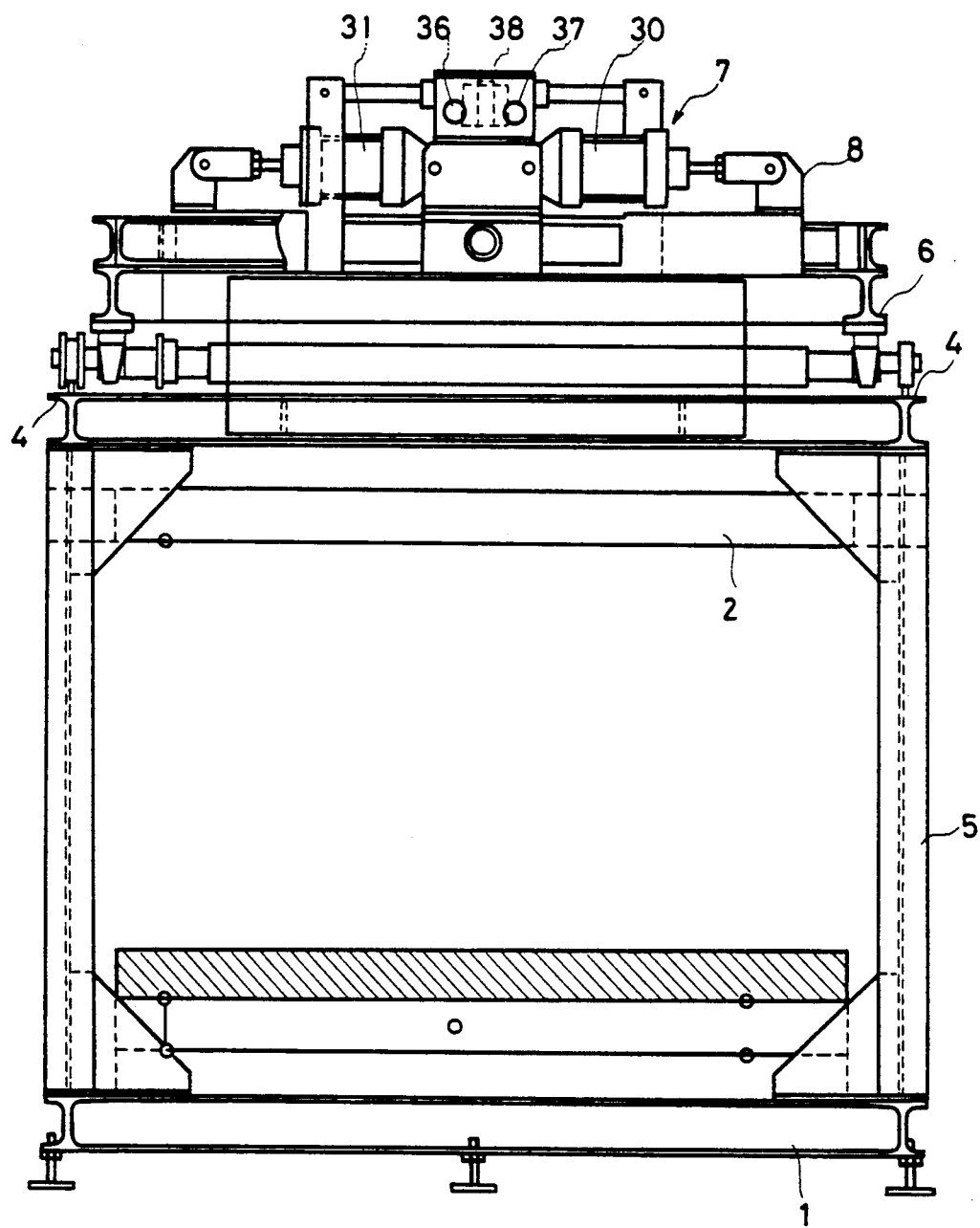
FIG. 8 is a side view thereof.

Referring now to FIGS. 6 through 16, the structure of the first embodiment of this invention palletizing device will be described. FIG. 6 is a plan view of an embodiment of this invention device, FIG. 7 a frontal view thereof, FIG. 8 a side view thereof, FIGS. 9 and 10 explanatory views to show how to attach holding mechanism onto a truck, FIG. 11 a frontal view of a stacker crane, FIG. 12 a side view thereof, FIG. 13 an explanatory view of pressing boards which are crossed, FIG. 14 a flow chart of pipings connected to cylinders for moving slide bosses for operating the holding mechanism, FIG. 15 a block diagram to show the structure of this invention embodiment device including a controlling block, and FIG. 16 the controlling block diagram to show the relation of a computer with elements to be controlled.

In the figures, the reference numeral 1 denotes a main frame in a rectangular form which is fixed on a floor surface. Two units of table lifters 2, 3 are arranged in parallel to each other in the longitudinal direction on the main frame. Two parallel rails 4 are supported with vertical supporting posts 5, 5 above the main frame 1, a truck 6 is mounted on the rails 4 in a manner movable in the longitudinal direction. By this arrangement, the truck is allowed to become positioned immediately above either of the table lifters 2 or 3.

Figure 9:
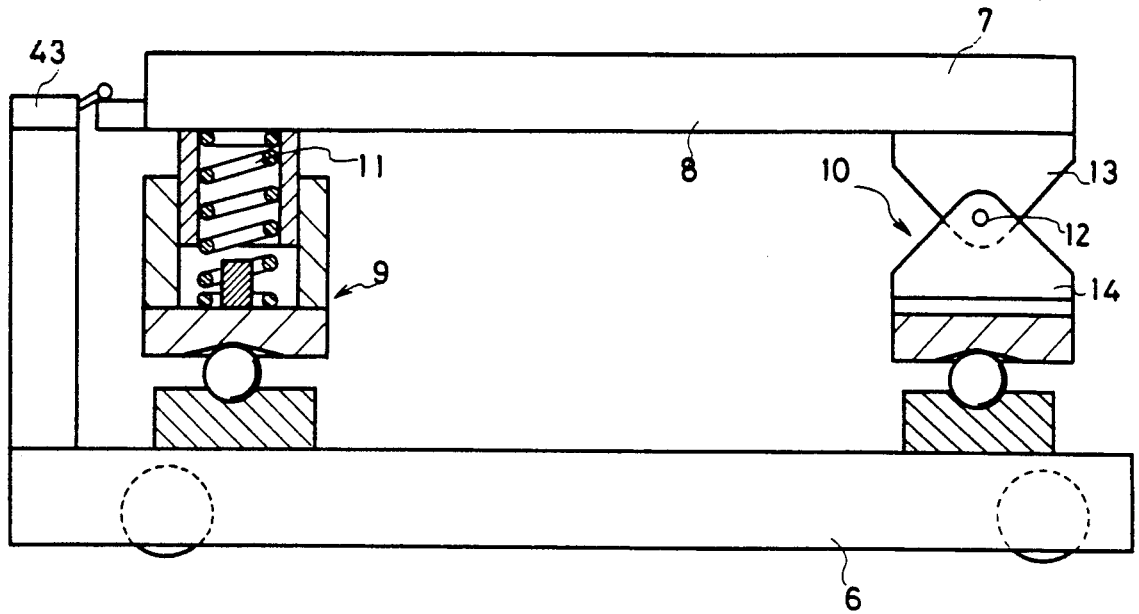
FIGS. 9 and 10 are explanatory views to show how to attach the holding mechanism of the first embodiment of this invention device onto a truck.
Figure 10:
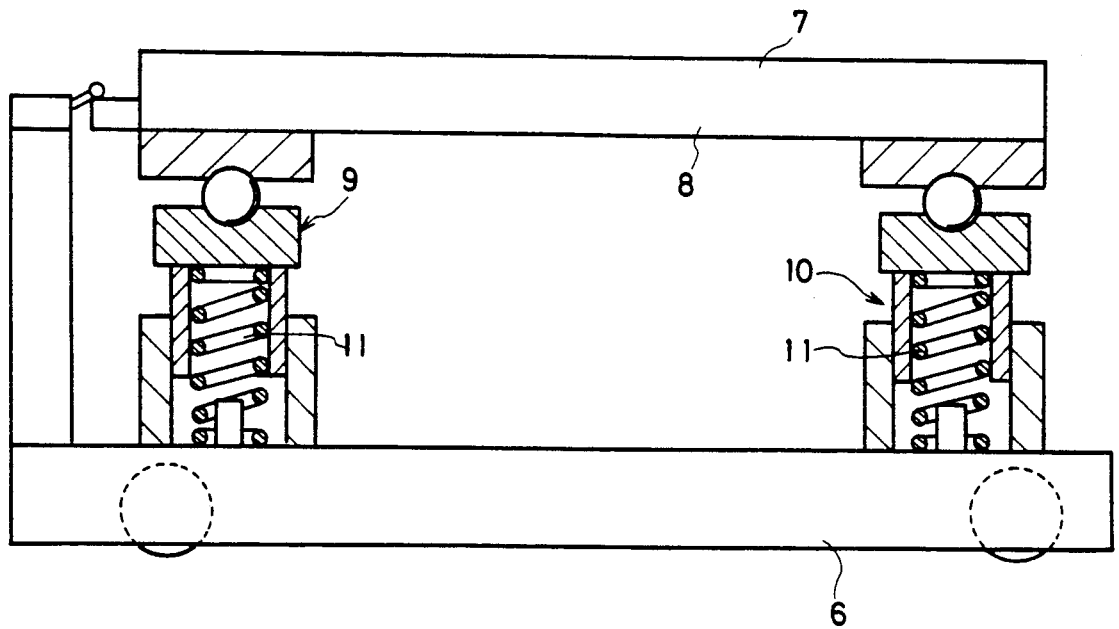

A holding mechanism 7 is incorporated within the truck 6. More particularly, as shown in FIG. 9, the holding mechanism 7 is supported on the truck 6 on both sides of a main body 8 thereof with universal supporters 9 and 10. One of the universal supporters 9 is provided with a spring 11 which keeps the holding mechanism main body 8 horizontally at a position where the weight of the holding mechanism 7 is applied while the other universal supporter 10 comprises brackets 13 and 14 which are connected in a swingable manner with an axial pin 12. The supporting structure with said universal supporters is not limited to the one shown in FIG. 9, but may be the one shown in FIG. 10 where both universal supporters are provided with springs 11 in a similar structure.

Figure 13:
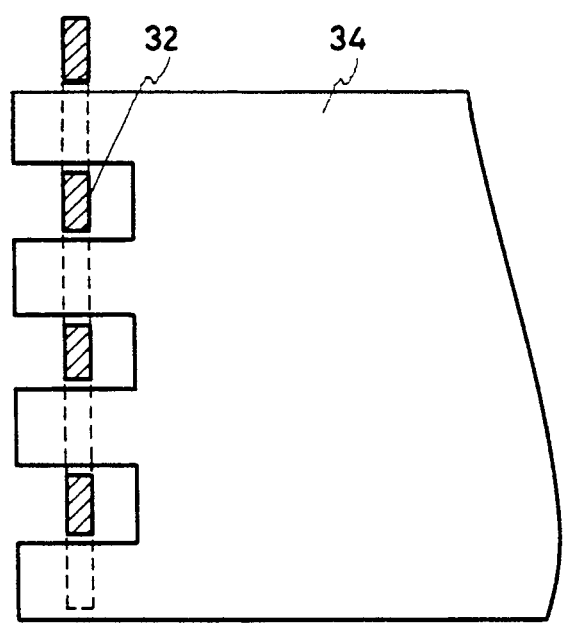
FIG. 13 is an explanatory view of pressing boards of this invention in a first embodiment.

The holding mechanism 7 may be of various forms. The main body 8 of the holding mechanism comprises guide sleeves 20, 21 for left/right direction and guide sleeves 22, 23 for forward/rearward direction which are assembled in a cross form with slide bosses 24, 25, 26 and 27 in a freely slidable manner, cylinders 28, 29, 30 and 31 for moving slide bosses which are aligned with guide sleeves 20, 21, 22 and 23 in a position thereabove, the cylinders being coupled on the extensible rod ends with the upper portion of slide bosses while on base ends thereof with the cross connection of guide sleeves 20, 21, 22 and 23, pressing boards 32, 33, 34 and 35 for pressing goods in the lateral and vertical directions which extend at a predetermined height in the direction perpendicular to the sliding direction of each slide boss 24, 25, 26 or 27 at the lower ends thereof. Each pressing board 32, 33, 34 or 35 has at both ends thereof an interfilling arrangement as shown in FIG. 13 so as to smoothly cross over adjacent ends of the adjacent pressing board.

In the figure, the reference numerals 36, 37 (FIGS. 6 through 8) denote racks to synchronize the movements in right/left direction of the pressing boards 32, 33 while 38 denotes a pinion for engaging the racks. The movements in rearward and forward direction of the pressing boards 34, 35 are also synchronized by a similar mechanism. The holding mechanism 7 is by no means limited to the embodiment shown, but may be any so long as it comprises two pairs of pressing devices which are arranged on four sides to oppose each other in two pairs. The reference numeral 42 denotes a photoswitch, and 43 a limit switch.

Figure 14:
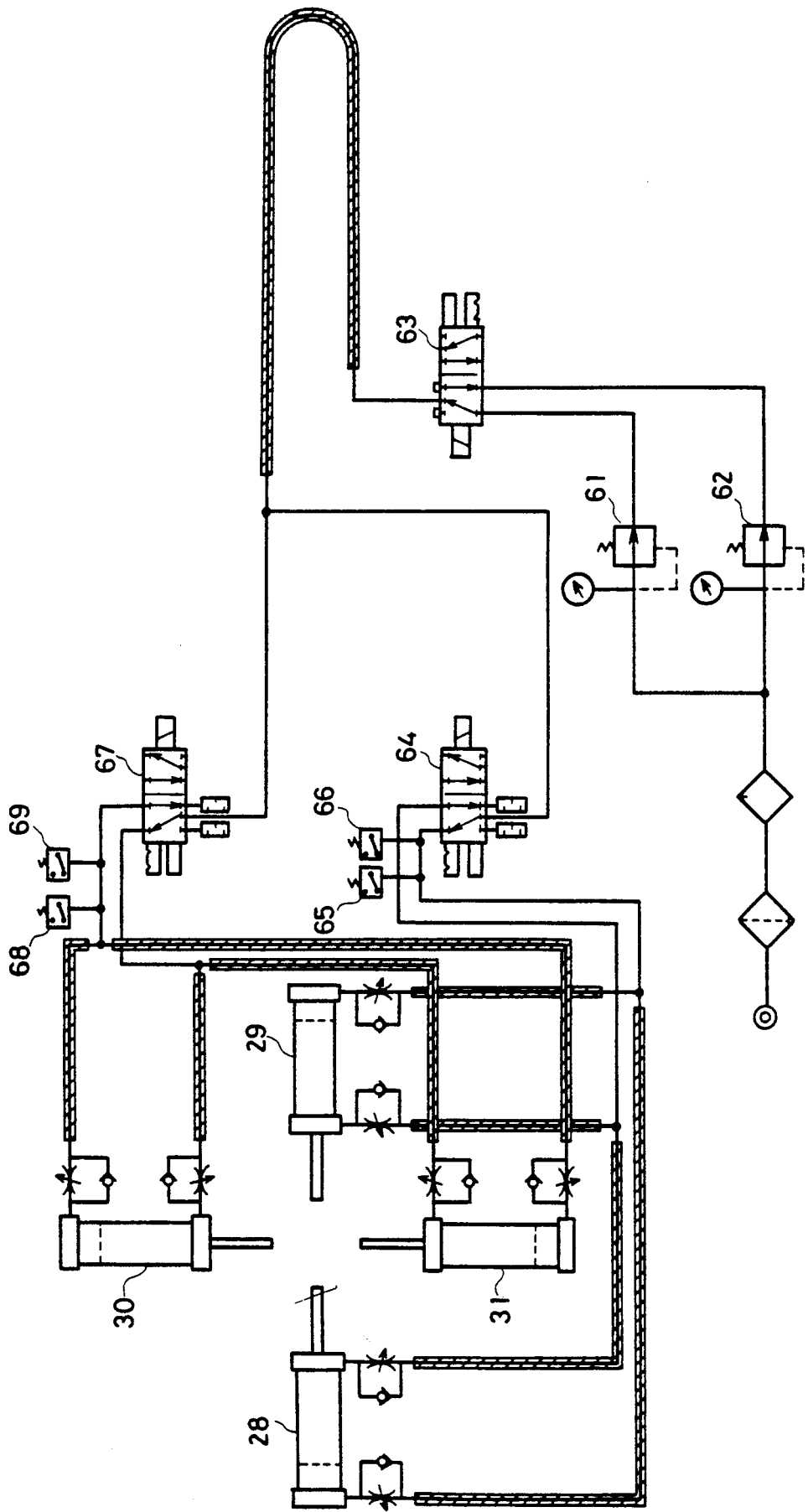
FIG. 14 is a flow chart of pipings connected to cylinders for moving slide bosses for operating the holding mechanism of the first embodiment of this invention.

FIG. 14 is a flow chart of the pipings such as hydraulic or air lines connected to the cylinders 28, 29, 30 and 31 for moving slide bosses to operate the holding mechanism 7. As shown in the figure, reducing valves 61, 62 are provided in parallel together with a switching valve 63 so as to be able to set two holding pressures. A switching valve 64 is provided to move a pair of the cylinders 28, 29 in right and left directions. Pressure switches 65, 66 are provided in order to confirm the completion of pressing.

Similarly, pressure switches 68, 69 are provided together with a switching valve 67 to operate a pair of cylinders 30, 31.

Figure 15:
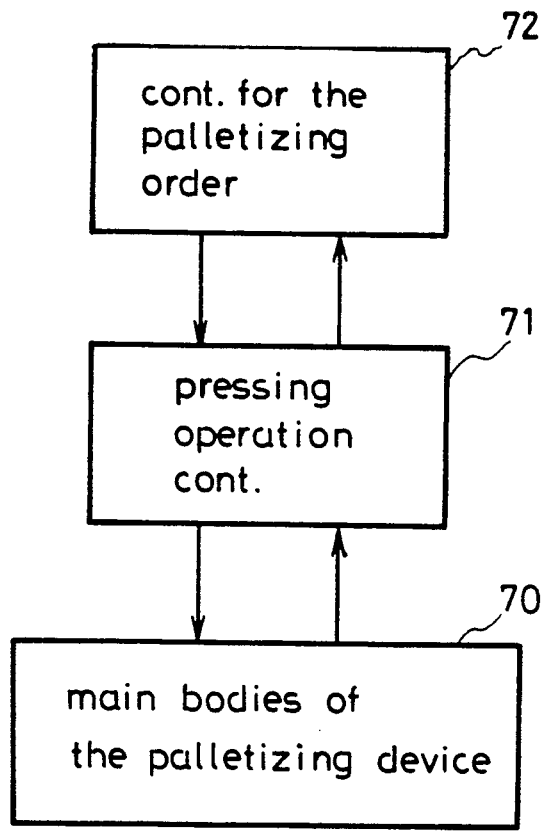
FIG. 15 is a block diagram to show the structure of the first embodiment including controlling block.

FIG. 15 is a block diagram to show the whole structure of the palletizing device of this embodiment including a controlling block thereof. This invention structure comprises a pressing operation controller 71 which controls the main bodies of the palletizing device 70 and of the holding mechanism 7, and controller for the palletizing order 72 which controls the order of layers for palletization. The controllers 71 and 72 include controlling means such as microcomputers.

Said three switching valves 63, 64 and 67 are controlled by the pressing operation controller 71 of FIG. 15 so that they will be set at two types of holding pressures depending on the strength and weight of the particular objects to be held; i.e. the stronger pressure, for instance, about 180 kg pressure when the reducing valve 61 is set at 5.0 kg/cm$^2$ and the weaker pressure, for instance, of about 90 kg when the reducing valve 62 is set at 2.5 kg/cm$^2$ In other words, the pressing operation controller 71 stores predetermined two types of pressures (high/low) for each kind of objects and controls the switching valve 63 in accordance with the stored data.

The pressing operation controller 71 controls said cylinders 28, 29, 30 and 31 to supply pressure, and when the pressure reaches a preset value, to actuate pressure switches 65, 66, 68, 69 to move the cylinders in the direction to release the pressure. The pressing operation controller 71 can respectively control pairs of cylinders separately or simultaneously, 28 and 29 which are paired for movement in right and left directions, and 30 and 31 which are paired for movements in rear and forward directions.

Figure 16:
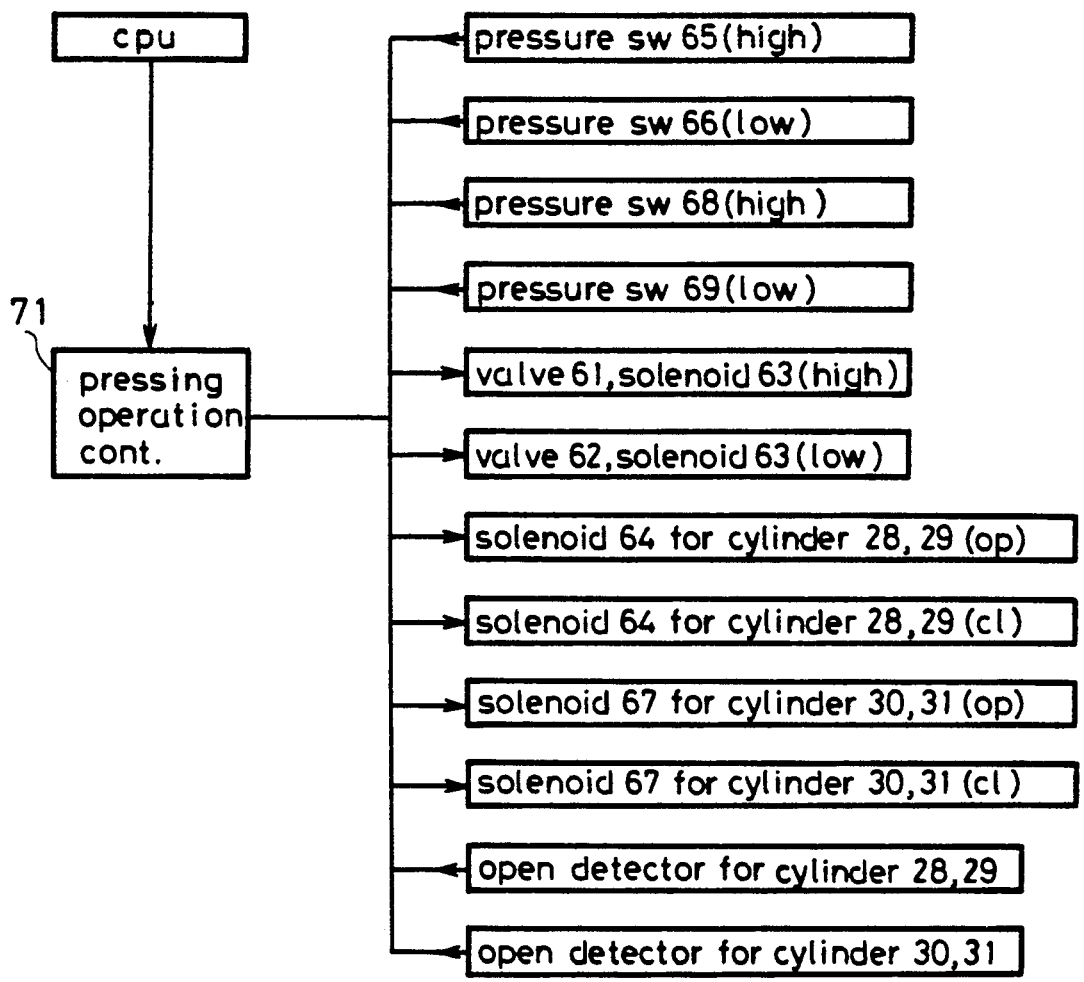
FIG. 16 is a controlling block diagram to show the relation between a computer and elements to be controlled in the first embodiment of this invention.

FIG. 16 shows the relation among devices to be controlled by the pressing operation controller 71 with direction from computers.

Description will now be given of an embodiment according to this invention which is applied for forming a unit load by the fifth embodiment method in correspondence to FIGS. 5A through 5C. The most basic palletizing operation will first be explained with said palletizing device.

An empty pallet 50 is placed on a table lifter 2, and another pallet 51 which carries thereon one type of goods assembled in layers is placed on another table lifter 3. Then, a truck 6 advances from the position shown in FIG. 7 to another position immediately above the table lifter 3 which subsequently moves upward. When a predetermined amount of time has elapsed after the uppermost surface of the goods on the table lifter 3 passes across the optical axis of a photoswitch 42, the table lifter 3 stops. Said predetermined amount of time is controlled by the pressing operation controller 71 to be equivalent to the time required to move one layer of goods $+\alpha$. This makes the topmost layer of the goods to come in a space surrounded by the two pairs of pressing boards 32, 33, 34 and 35 or in the space where one layer of goods can be held on all four sides by a sufficient area. Then, goods on the topmost layer are held with pressure on four sides by the pressure boards 32, 33, 34 and 35 by actuating two pairs of pressing devices.

As shown with the numerals in FIG. 5A, the two pairs of pressing devices correct misalignment in left and right directions among goods by actuating the cylinders 28, 29 in direction (1). When the pressure reaches a preset value, the pressure switches 65, 66 are actuated to make the cylinders 28, 29 to move in the direction (2) in FIG. 5A to release the pressure. After confirming that the cylinders 28, 29 have been opened, the cylinders 30, 31 are actuated to move in the direction (3) thereby correcting misalignment in rear and forward directions with pressure. When other pressure switches 68 and 69 are actuated the cylinders 28 and 29 press goods in a direction (4) as on FIG. 5 (A), with pressure in a direction (3) being maintained. When the pressure switches 65, 66 confirm that the pressure reaches a preset value, the table lifter 3 slightly lowers and the truck 6 advances further to the position immediately above the table lifter 2 while maintaining the pressure.

The operation of the two pairs of good pressing devices is, however, not limited to the above. Instead, as shown in FIG. 5B, at the same time as the cylinders 28, 29 are open, the cylinders 30, 31 may be actuated to press, or a alternately as shown in FIG. 5C misalignment is corrected in both directions, and then cylinders 28, 29, 30 and 31 may be open simultaneously, and then apply pressure.

When the truck 6 comes immediately above the table lifter 2, the table lifter 2 stays on stand-by at a position slightly lower than the bottom level of the goods held. The table lifter 2 is then moved upward to make the upper surface of the pallet 50 contact with the lower surface of corrugated fiberboard boxes held by the holding mechanism 7.

The table lifter 2 further moves upward to raise the holding mechanism 7 which is supported by the universal supporters 9, 10 with the spring 11. Then, the limit switch 43 is actuated to suspend the upward movement of the table lifter 2 while the holding mechanism 7 releases the pressure on the goods. Then the table lifter 2 starts lowering to be suspended at the position after a preset time controlled with a timer or to the position downward by one layer $+\alpha$. Goods of different type are placed on the table lifter 3 and the above described operation is repeated in a similar manner to thereby palletize goods of different kinds in the unit of a layer on the pallet 50 placed on the table lifter 2.

Figure 11:
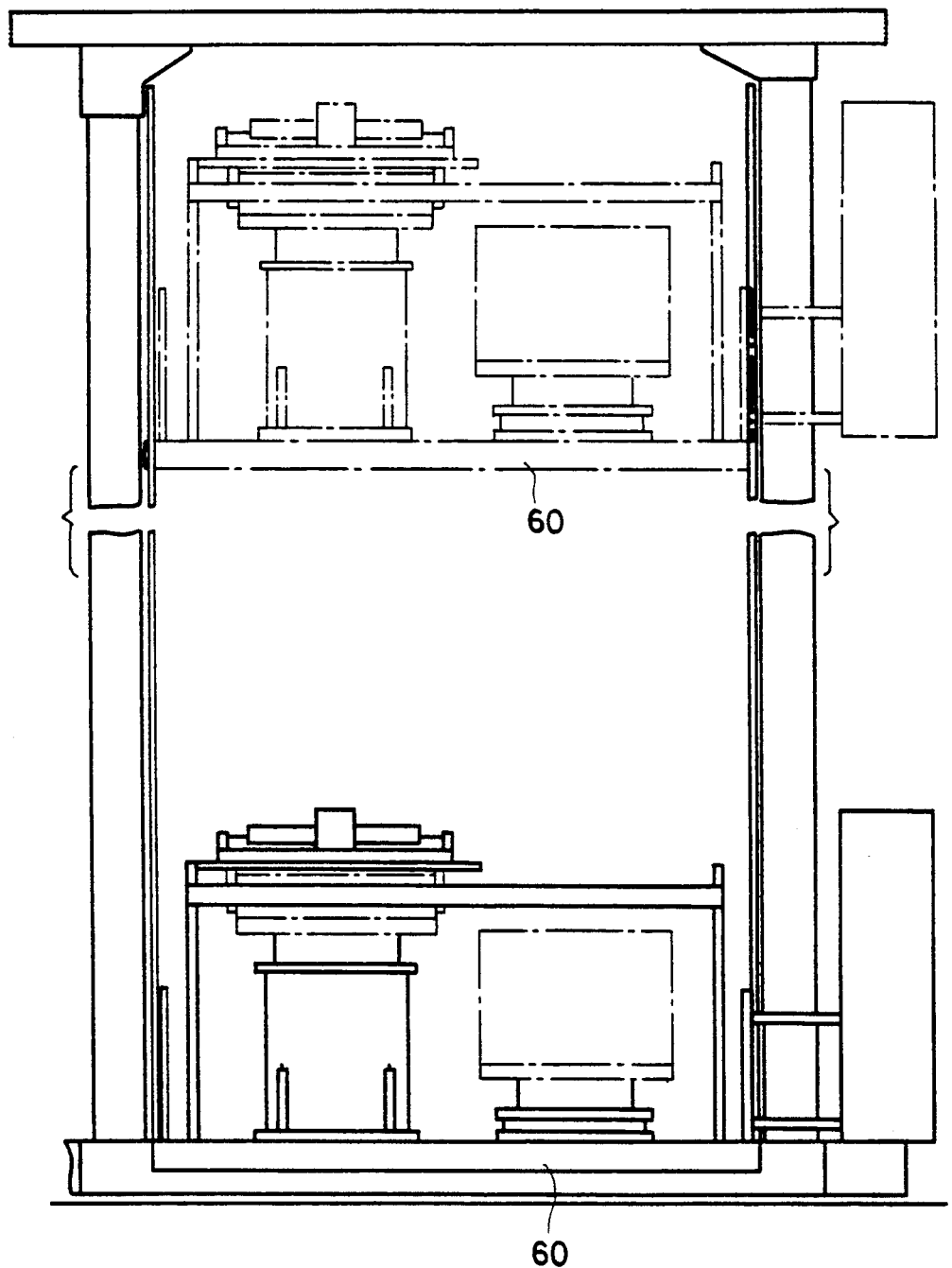
FIG. 11 is a frontal view of a stacker crane which carries the first embodiment of this invention palletizing device.
Figure 12:
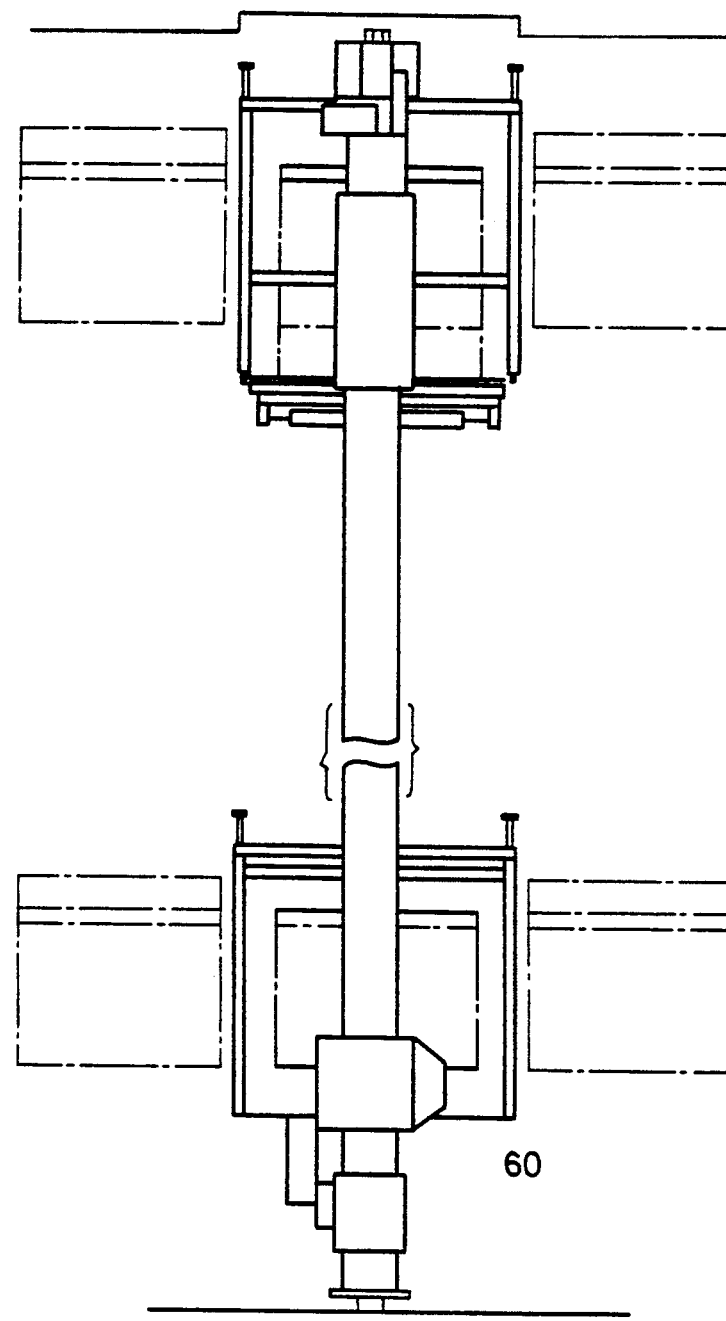
FIG. 12 is a side view of the stacker crane shown in FIG. 11.

Although the handling arrangements used in the above are of a simple structure for facilitating understanding, conveyors or fork lifts may be added before or after the table lifters 2 and 3 in order to convey in or convey out goods. The main frame 1 may be placed on a movable truck as a whole or on a carriage 60 of a stacker crane as shown in FIGS. 11 and 12 so that goods can be taken out from left and right shelves to form layers of goods of one kind. The layers may be piled on the pallet, and when the number of goods reaches a predetermined value, they may be carried out at a shipment station.

Operation of the controller for palletizing order 72 which is incorporated in the above palletizing device will be described taking an example of a case where a unit load is formed by said embodiment and in accordance with the methods of the first to fourth embodiments. The controller for the palletizing order 72 includes one or more microcomputers with various programs of the palletizing order for this invention determining the conditions for dimensions of layer areas, of void spaces, and of goods and dimensional relation thereof and the basic conditions which have already been described in the foregoing description on this invention method. For instance, in the case of the embodiment shown in FIG. 1, goods are palletized in the order of A1, B1, C1 and D1 while in the case shown in FIG. 2 they are in the order of B2, C2, A2 and D2. In the case shown in FIG. 3, goods are palletized in the order of B3, C3 and D3 on one pallet and goods in the layer of A3 are palletized on another pallet separately.

Although the device used in the above explanation has a mechanism for holding goods in the unit of one layer the methods of the first through fourth embodiments do not necessarily have such a device. They may be applicable to known palletizers using the method of arranging cases of one or plural types in the unit of rows.

Figure 17:
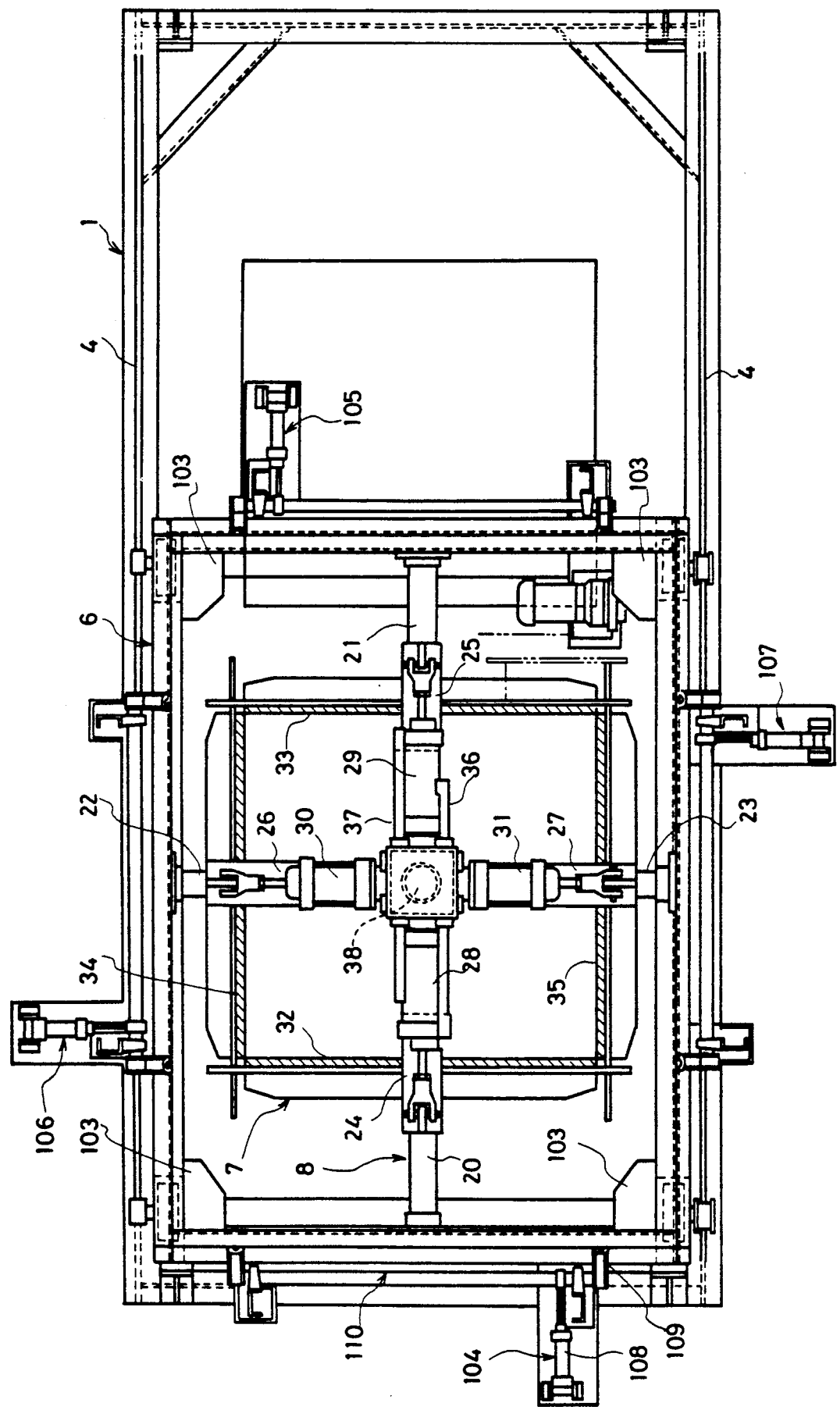
FIG. 17 is a plane view of the second embodiment of this invention palletizing device.
Figure 18:
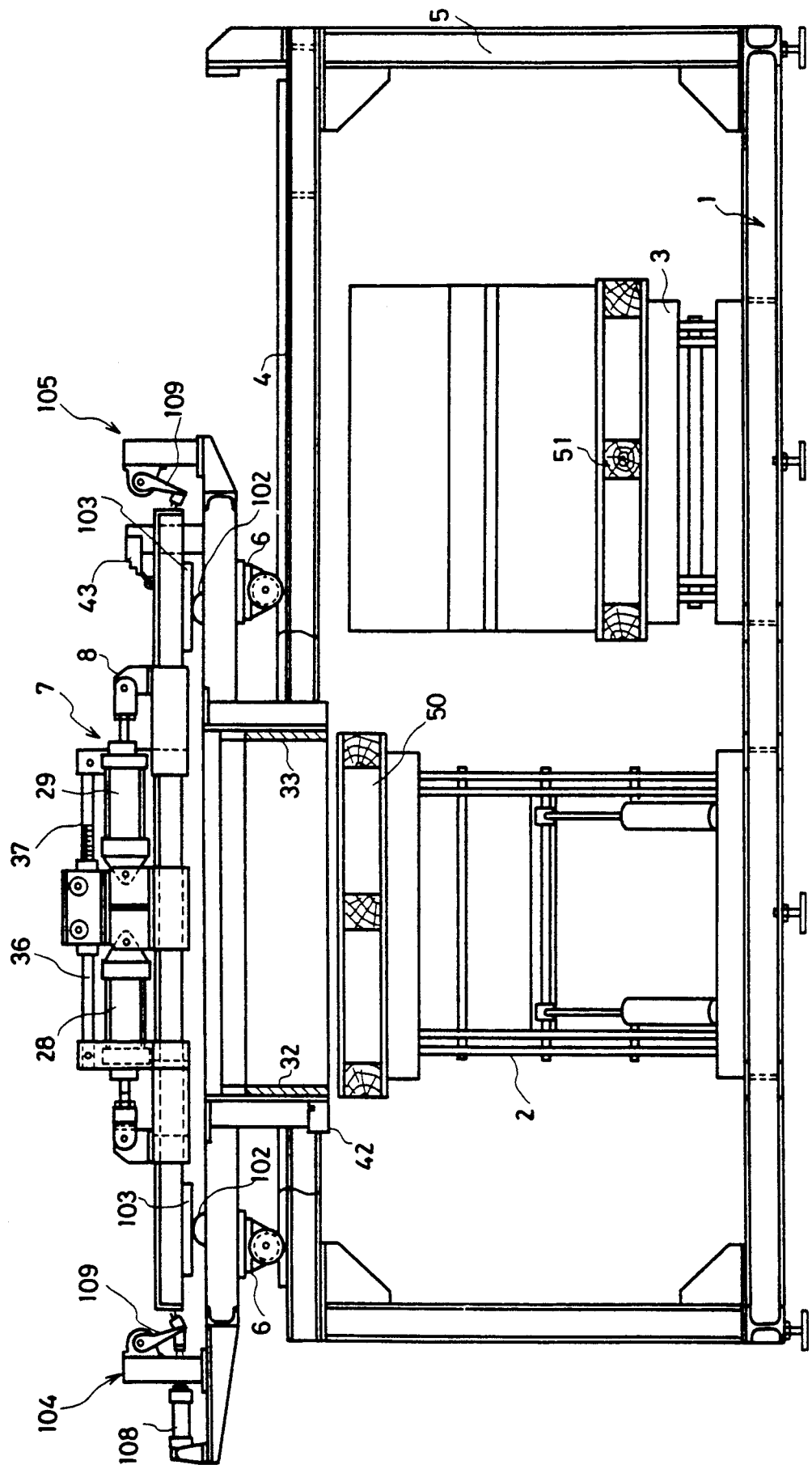
FIG. 18 is a frontal view of the second embodiment.
Figure 19:
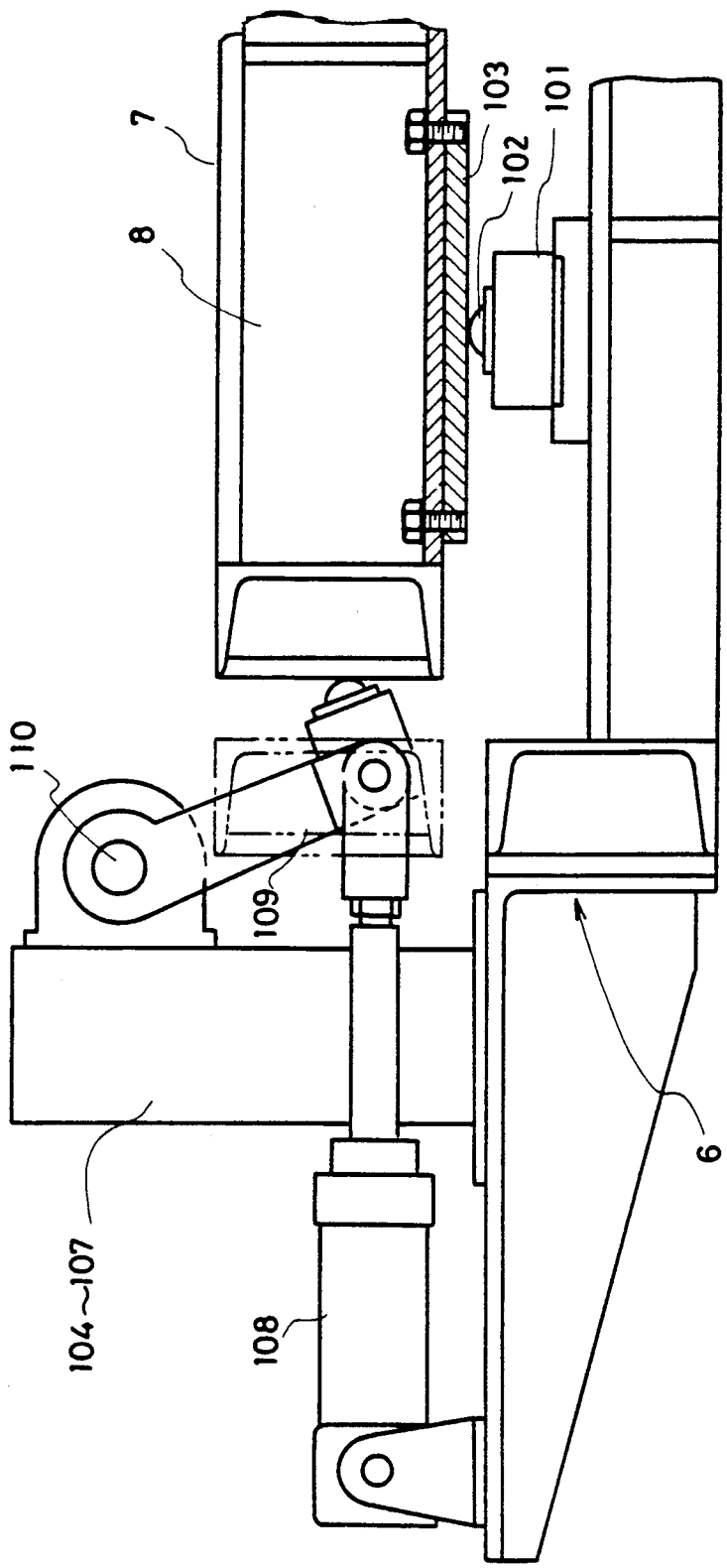
FIG. 19 is a partially enlarged view of FIG. 18.

FIGS. 17 through 19 show the second embodiment of this invention palletizing device; FIG. 17 is a plane view, FIG. 18 a frontal view and FIG. 19 a frontal view of the one shown in FIG. 18 in partial enlargement. This embodiment differs from the first embodiment in that a centering mechanism is further added in order to freely center and register the holding mechanism main body 8 with the central position of the good layers.

As shown in FIGS. 17 through 19, a truck 6 is provided with ball receptors 101 (FIG. 19) at the four corners thereof. The ball receptors 101 are respectively provided with rotatable balls 102 in a manner to allow them to project therefrom. Flat receiving surfaces 103 are provided to abut against the rotational balls 102 at the position on the main body 8 of the holding mechanism which opposes said ball receptors 101. By this arrangement, the holding mechanism main body 8 may be freely movable on the upper surface of the rotatable balls 102 relative to the sides of the truck 6 and centered at the central position for good layers when the pressing boards 32, 33, 34 or 35, attached to each of slide bosses 24, 25, 26 and 27, hold the goods.

Holding mechanism main body pressing devices 104, 105, 106 and 107 are provided on each of the four sides surrounding the holding mechanism main body 8. The holding mechanism main body pressing devices 104, 105, 106 and 107 respectively comprises a pressing cylinder 108, a pressing arm 109 and a connecting shaft 110 as shown in FIG. 19 which are actuated by a pressing cylinder 108. The holding mechanism main body pressing devices 104, 105, 106 and 107 enable the holding mechanism main body 8 to be centered relative to the central position of the truck 6.

Figure 20A:
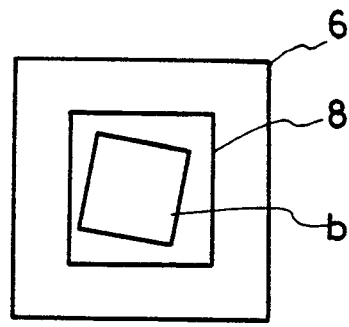
FIGS. 20A through 20C are explanatory views to show the operation of the second embodiment of the device.
Figure 20B:
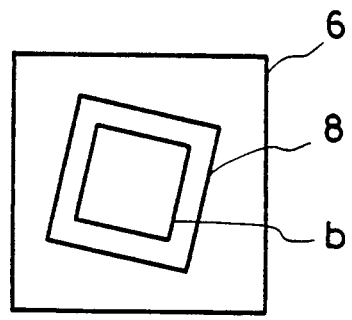
Figure 20C:
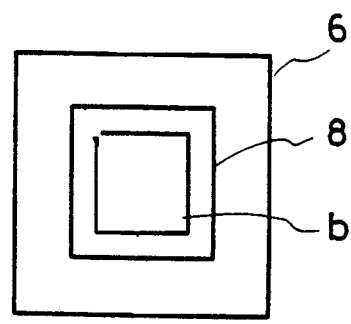

An example of palletizing by this invention embodiment device is described referring to the model of operation shown in FIGS. 20A through 20C.

An empty pallet 50 is placed on the table lifters 2 while a pallet 51 which carries layers of goods of one type is placed on another table lifter 3. A truck 6 advances from the position shown in FIG. 18 to a position immediately above the table lifter 3, and the table lifter 3 then moves upward. When a predetermined amount of time has passed after the topmost surface of the layered goods on the table lifter 3 has passed across the optical axis of a photo-switch 42, the table lifter 3 suspends its elevation. The predetermined amount of time is set by a pressing operation controller 7 to be equivalent to the time required for raising one layer $+\alpha$ of goods in layer.

In other words, the topmost layer of the goods comes into the space surrounded by the pressing boards 32, 33, 34 and 35 of the holding mechanism main body 8 or comes to the position where one layer of goods can be held on all the four sides by wide area. FIG. 20A is an explanatory view to show the positional relation among the truck 6, holding mechanism main body 8 and goods b, and in the goods the layer b of the goods is oblique to and misaligned with the truck 6 and the holding mechanism main body 8.

The pressing boards 32, 33, 34 and 35 are actuated by cylinders 28, 29, 30 and 31 of the holding mechanism main body 8 to hold with pressure the four sides of the topmost layer of goods. Due to the presence of said ball receptors 101 with the rotational balls 102 and flat receiving surfaces 103, the holding mechanism main body 8 is automatically centered in alignment with the goods layer b so that the center of the holding mechanism main body 8 coincides with the center of the goods layer b and the direction thereof is aligned with that of the goods layer b as shown in FIG. 20B.

The center and direction of the holding mechanism main body 8 and the goods layer b are still misaligned with those of the truck 6. In order to correct this misalignment, pressing cylinders 108 of holding mechanism main body pressing device 104, 105, 106 and 107 are driven to center the holding mechanism main body 8 with the truck 6 as shown in FIG. 20C for the predetermined holding operation.

The holding mechanism main body 8 becomes freely slidable via flat receiving surfaces 103 in combination with the rotational balls 102 provided on the ball receptors 101 on the truck 6 when the holding mechanism main body 8 holds goods and is centered in alignment with the good layer. This enables secure centering in the unit of layer of goods.

Figure 21:
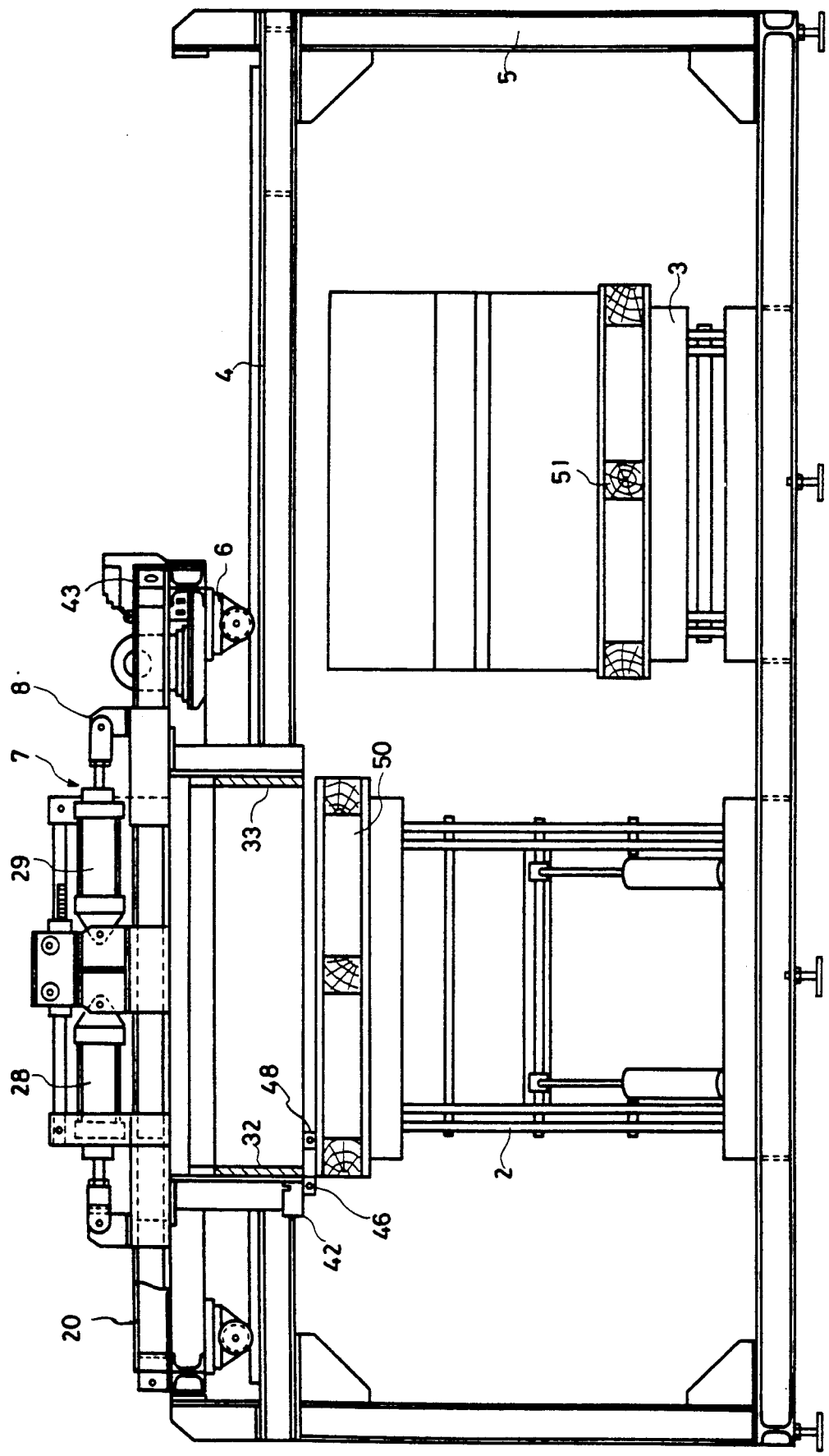
FIG. 21 is a frontal view of the third embodiment of this invention palletizing device.
Figure 22:
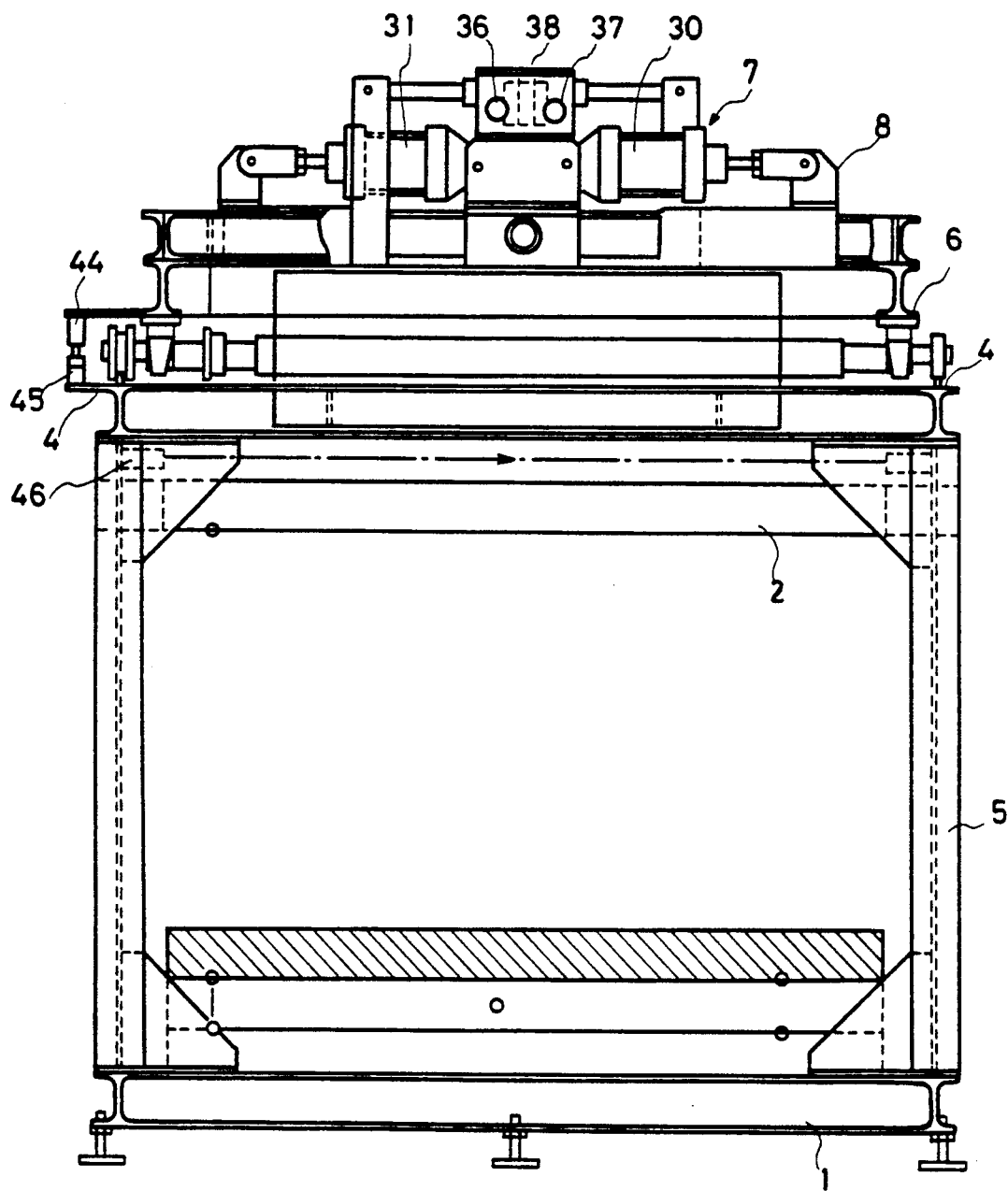
FIG. 22 is a side view of the third embodiment.

FIGS. 21 and 22 show the third embodiment of this invention device; i.e. FIG. 21 is a frontal view while FIG. 22 is a side view thereof. This embodiment differs from the first embodiment device in that a detector is further included in the system so that the position for suspending the truck 6 can be detected by detecting the tip end of the pressing board 32 on the end of the truck 6. More particularly, besides the limit switch 44 and the dike 45 for traveling control, there are provided photo-switches 46, 47, 48 and 49. The photo-switch 49 is mounted at the side opposing the photo-switch 48 and is not shown in FIG. 21.

The operation of this embodiment will now be described. When the truck 6 advances toward the table lifter 2, the tip end of a pressing board 32 on the advancement side of the truck 6 is detected by photo switches 46, 47 on the frames, and the truck 6 stops at the detected position. Irrespective of the layer area dimension of goods, goods are aligned linearly at the advancing side on the pallet 50 and the thus formed unit load has its side vertical to the bottom.

The limit switch 44 and the dike 45 are for detecting the position where the truck 6 starts reducing speed. At the detected position, the speed of truck 6 is reduced so as to enhance the precision in stopping.

The limit switch 44 and the dike 45 may be replaced with photoswitches 48, 49 (in this case they may be provided on the side of the table lifter 3 in parallel to the photoswitches 46, 47). The photoswitches 48, 49 detect the tip end of the pressing board 33 and the truck 6 reduces its speed at the detected position. Irrespective of the layer area dimension of goods, the distance where the truck advances at a low speed can, therefore, be made constant to thereby increase the palletizing ability.

One of the photoswitches 46 or 47 may be provided on the frame while the other photoswitch may be provided on the pressing board 32 so that the stop position of the truck 6 can be detected.

As described in detail in the foregoing, palletizing device of this invention incorporates a detector to control the position for stopping trucks by reference to the pressing board and mounted on the advancement end thereof, and it facilitates forming of unit load aligned linearly at least on one side of a layer to allow the use of an automatic strapping machine for horizontal strapping goods in the unit of a layer.

What we claim is:

1. A method for palletizing goods of different types in a load with units of layers which is characterized in that a unit load is formed based on the dimensional relation among layer area dimensions of said goods, dimensions of void spaces which are not occupied with said goods and dimensions of said goods and comprising the steps of:
    (a) first on a bottom layer having a selected area dimension, establishing a first layer of goods corresponding to said selected area dimension,
    (b) establishing subsequent layers vertically above the bottom layer of goods, layers of goods being piled in the unit of layers by holding at opposed pairs of sides, front-back and left-right, a layer of goods in the unit load with pressure by two pairs of palletizers, holding one opposed pair of sides, then releasing such pressure, holding the other opposed pair of sides, and then again holding at both opposed pairs of sides with pressure, (c) exchanging a vertically upper layer of goods with an immediately subjacent layer when an item of goods of said immediately subjacent layer falls into a void occurring in a layer immediately under said subjacent layer, and (d) where an unbalanced condition would result from the arrangement of step (c), removing and rearranging the layer having the void instead of exchanging the two layers that would have been placed immediately above said layer having the void.

2. The method for palletizing goods in the unit of layers as claimed in claim 1 including the step of providing the unit load with at least one side surface substantially vertical to the bottom surface.

* * * * *